(12) United States Patent
Kang et al.

(10) Patent No.: US 12,434,528 B2
(45) Date of Patent: Oct. 7, 2025

(54) ULTRA-LOW HEAVY-DUTY ACTIVE SUSPENSION, SUSPENSION VEHICLE AND LEVELING CONTROL METHOD

(71) Applicant: Jiangsu University of Technology, Changzhou (CN)

(72) Inventors: Shaopeng Kang, Changzhou (CN); Kailei Liu, Changzhou (CN); Hongbin Qiang, Changzhou (CN); Xia Ye, Changzhou (CN); Jing Yang, Changzhou (CN); Cheng Han, Changzhou (CN); Penghui Huang, Changzhou (CN); Yuxin Li, Changzhou (CN)

(73) Assignee: Jiangsu University of Technology, Changzhou (CN)

( * ) Notice: Subject to any disclaimer, the term of this patent is extended or adjusted under 35 U.S.C. 154(b) by 57 days.

(21) Appl. No.: 18/412,032

(22) Filed: Jan. 12, 2024

(65) Prior Publication Data
US 2024/0157750 A1 May 16, 2024

(51) Int. Cl.
*B60G 17/018* (2006.01)
*B60G 17/019* (2006.01)
*B60G 17/08* (2006.01)

(52) U.S. Cl.
CPC ..... *B60G 17/018* (2013.01); *B60G 17/01908* (2013.01); *B60G 17/08* (2013.01); *B60G 2200/10* (2013.01); *B60G 2204/83022* (2013.01); *B60G 2206/0112* (2013.01); *B60G 2300/36* (2013.01); *B60G 2300/37* (2013.01); *B60G 2800/019* (2013.01)

(58) Field of Classification Search
CPC B60G 17/018; B60G 17/01908; B60G 17/08; B60G 2200/10; B60G 2204/83022; B60G 2800/019; B60G 2206/0112; B60G 2206/011; B60G 2206/0114; B60G 2300/37; B60G 2300/36
See application file for complete search history.

(56) References Cited

U.S. PATENT DOCUMENTS 5,379,842 A * 1/1995 Terry ................. B60P 1/02
180/21

FOREIGN PATENT DOCUMENTS

| CN | 114789634 A | 7/2022 |
| CN | 114905910 A | 8/2022 |

* cited by examiner

*Primary Examiner* — Jacob M Amick

(57) ABSTRACT

A heavy-duty active suspension, including a suspension frame, a lifting unit, a pin axle, a through axle, two wheel-driving units, an encoder, and a displacement sensor. The lifting unit is mounted on an upper side of the suspension frame for driving a heavy-duty support platform to rise and descend. The pin axle is mounted across the suspension frame along a front-rear direction. The through axle is rotatably mounted on the pin axle through a bearing, and is across the suspension frame along a left-right direction. The two wheel-driving units are respectively mounted on both ends of the through axle. The encoder is installed on the through axle for measuring a swing angle of the through axle. The displacement sensor is installed between an output end of the lifting unit and the suspension frame. A suspension vehicle including the active suspension and a leveling control method thereof are further provided.

10 Claims, 15 Drawing Sheets

ULTRA-LOW HEAVY-DUTY ACTIVE SUSPENSION, SUSPENSION VEHICLE AND LEVELING CONTROL METHOD

CROSS-REFERENCE TO RELATED APPLICATIONS

This application claims the benefit of priority from Chinese Patent Application No. 202310060324.3, filed on Jan. 16, 2023. The content of the aforementioned application, including any intervening amendments thereto, is incorporated herein by reference in its entirety.

TECHNICAL FIELD

This application relates to heavy-duty transportation, and more particularly to an ultra-low heavy-duty active suspension, a suspension vehicle, and a leveling control method.

BACKGROUND

In the traditional heavy-duty transportation mode, the transportation of heavy objects requires the simultaneous operation of multiple devices, which is cumbersome and inefficient. This process also relies on the assistance of manpower, which may threaten the personal safety of workers. In the actual operation, due to the height difference between working surfaces, it often takes a long time to align and connect the suspension vehicle with the tractor, increasing the consumption of labor and time. In addition, during the transportation, when encountering complex road conditions, such as transverse wave road conditions, longitudinal wave road conditions and alternating transverse and longitudinal wave road conditions, the goods will bring insecurity due to bumps, or may be damaged, causing direct economic losses or safety accidents.

Moreover, the existing suspension vehicles are generally engaged with a rear side of the tractor, and is pulled by the tractor. It is necessary to control the tractor to approach the suspension vehicle to complete the engagement, and the suspension vehicle cannot move and adjust the angle autonomously.

SUMMARY

In view of the deficiencies in the prior art that it is inconvenient to complete motion and angle adjustment of the suspension vehicle, and the leveling control cannot be actively performed in complex road conditions, this application provides an ultra-low heavy-duty active suspension that is powered and can perform automatic leveling, a suspension vehicle, and a leveling control method.

Technical solutions of this application are described as follows.

In a first aspect, this application provides a heavy-duty active suspension, comprising:
a suspension frame;
a lifting unit;
a pin axle;
a through axle;
two wheel-driving units;
an encoder; and
a displacement sensor;
wherein the lifting unit is arranged on an upper side of the suspension frame, and is configured for driving a heavy-duty support platform of a vehicle to rise and descend; the pin axle is configured to run through the suspension frame along a longitudinal direction; the through axle shaft is rotatably arranged on the pin axle through a first bearing, and is configured to run through the suspension frame along a transverse direction; the two wheel-driving units are respectively arranged on both ends of the through axle through a second bearing; the encoder is arranged on the through axle, and is configured for measuring a transverse swing angle of the through axle; and the displacement sensor is arranged between an output end of the lifting unit and the suspension frame.

In an embodiment, the lifting unit comprises a hydraulic cylinder, an inner guide sleeve, an outer guide sleeve, a proportional servo valve, and a slewing bearing;
the hydraulic cylinder is arranged on the suspension frame; the inner guide sleeve is sleevedly provided outside the hydraulic cylinder, and is fixedly connected to a base of the hydraulic cylinder; the outer guide sleeve is slidingly connected outside the inner guide sleeve; the proportional servo valve is configured for controlling a flow rate of the hydraulic cylinder; and the slewing bearing is configured for connection with the heavy-duty support platform of the vehicle; and
a top end of a piston rod of the hydraulic cylinder is fixedly connected to an inner ring of the slewing bearing; an upper end of the outer guide sleeve is fixedly connected to the inner ring of the slewing bearing; and an outer ring of the slewing bearing is fixedly connected to the heavy-duty support platform of the vehicle; and an oil return port of the proportional servo valve is connected to an oil chamber of the hydraulic cylinder through a pipeline.

In an embodiment, a middle of the through axle is provided with a through hole along the longitudinal direction; two ends of the through axle are each provided with a wheel mounting hole; the pin axle is fixedly connected to the suspension frame; the heavy-duty active suspension further comprises a self-aligning ball bearing; an outer ring of the self-aligning ball bearing is mounted in the through hole; and an inner ring of the self-aligning ball bearing is fixedly connected to the pin axle.

In an embodiment, each of the two wheel-driving units comprises a hydraulic motor, a drive sprocket, a wheel axle, a driven sprocket, a roller chain and a wheel;
the hydraulic motor is mounted on the suspension frame; the drive sprocket is coaxially arranged on an output shaft of the hydraulic motor; the wheel axle is rotatably connected to the wheel mounting hole through a third bearing; the driven sprocket is fixedly mounted on the wheel axle; the roller chain is connected to the drive sprocket and the driven sprocket; and the wheel is fixedly mounted on the wheel axle; and
the hydraulic motor, the encoder, the displacement sensor, and the proportional servo valve are electrically coupled to a controller.

In an embodiment, the pin axle is sleevedly provided with a bearing gasket; the pin axle is fixedly provided with a limit screw; and the bearing gasket is configured to be limited between the limit screw and the through axle for preventing the pin axle from shifting.

In an embodiment, an end of the pin axle is fixedly connected to an encoder mounting bracket; a fixed end of the encoder is mounted on the encoder mounting bracket; the encoder comprises a rotating shaft; the rotating shaft is connected to a first end of a L-shaped shaft holder; and a second end of the L-shaped shaft holder is fixedly connected to an outer side of the through axle.

In an embodiment, a fixed end of the displacement sensor is fixed to an end of the suspension frame or an end of the pin axle; and a measuring end of the displacement sensor is fixedly connected to the outer guide sleeve.

In a second aspect, this application provides a heavy-duty suspension vehicle, comprising:
a heavy-duty support platform; and
the heavy-duty active suspension;
wherein the heavy-duty active suspension is provided in plurality, and a plurality of heavy-duty active suspensions are arranged in pairs below the heavy-duty support platform;
the heavy-duty support platform is fixedly connected to the outer ring of the slewing bearing; the controller is electrically connected to a general control system on a transport vehicle; and a center of the heavy-duty support platform is provided with an inertial measurement unit for detecting a position and orientation of the heavy-duty support platform in real time.

In a third aspect, this application provides a leveling control method of the heavy-duty suspension vehicle, wherein the number of the plurality of heavy-duty active suspensions is four, and four heavy-duty active suspensions are respectively provided at four corners of the heavy-duty support platform; and
the leveling control method comprises:
(S1) sending, by the inertial measurement unit, a detected real-time position and orientation data of the heavy-duty support platform to the general control system; and calculating, by the general control system, a target vertical displacement $z_d$ of each of four heavy-duty active suspensions when the heavy-duty support platform is adjusted to a horizontal state;
(S2) detecting and sending, by the encoder, rotation angles $\theta_A$, $\theta_B$, $\theta_C$, and $\theta_D$ of through axles of the four heavy-duty active suspensions to the general control system; based on the rotation angles $\theta_A$, $\theta_B$, $\theta_C$, and $\theta_D$, calculating, by the general control system, a vertical displacement deviation $z_e$ caused by rotation of the through axles of the four heavy-duty active suspensions;
(S3) calculating, by the general control system, a target vertical displacement $z_s$ of the hydraulic cylinder of each of the four heavy-duty active suspensions, expressed as;

$$z_s = z_d - z_e;$$

(S4) sending, by the general control system, the target vertical displacement $z_s$ to the controller of each of the four heavy-duty active suspensions;
collecting, by the displacement sensor of each of the four heavy-duty active suspensions, an actual vertical displacement $z$;
obtaining an error $e_z$, wherein the error $e_z$ is a difference between the target vertical displacement $z_s$ and the actual vertical displacement $z$;
performing a proportion-integral-differential (PID) algorithm on the error $e_z$ to obtain a control signal $u_z$ of the four heavy-duty active suspensions; and
sending, by the controller, the control signal $u_z$ to a pump station and the proportional servo valve, so that the pump station supplies oil, and the proportional servo valve controls flow of the oil to realize extension and retraction of the hydraulic cylinder, so as to control the lifting unit to level the heavy-duty support platform to ensure the heavy-duty suspension vehicle level when encountering road condition changes.

In an embodiment, the target vertical displacement $z_d$ of each of the four heavy-duty active suspensions is calculated through steps of:
(S11) setting a coordinate system $OX_0Y_0Z_0$ as a geodetic inertial coordinate system and a coordinate system OXYZ as a relative coordinate system of the heavy-duty support platform; detecting, by the inertial measurement unit, an X-axis rotation angle and a Y-axis rotation angle of the relative coordinate system relative to the geodetic inertial coordinate system under an actual road condition as a roll angle $\beta$ and a pitch angle $\gamma$, respectively; and sending the roll angle $\beta$ and the pitch angle $\gamma$ to the general control system;
(S12) keeping a height of a center point of the heavy-duty support platform unchanged; obtaining a rotation matrix $R(x, \beta)$ by rotating the heavy-duty support platform around an X-axis of the coordinate system OXYZ by an angle of $\beta$; and obtaining a rotation matrix $R(y, \gamma)$ by rotating the heavy-duty support platform around a Y-axis of the coordinate system OXYZ by an angle of $\gamma$;
(S13) defining the four heavy-duty active suspensions of the heavy-duty suspension vehicle respectively as suspension A, suspension B, suspension C, and suspension D, whose coordinates in the relative coordinate system are expressed as:

$$[A\ B\ C\ D] = \begin{bmatrix} -0.5b & -0.5b & 0.5b & 0.5b \\ -0.5a & 0.5a & 0.5a & -0.5a \\ 0 & 0 & 0 & 0 \end{bmatrix};$$

and
(S14) based on the rotation matrix $R(x, \beta)$, the rotation matrix $R(y, \gamma)$, and the coordinates of the four heavy-duty active suspensions in the relative coordinate system, calculating, by the general control system, the target vertical displacement $z_d$ of each of the four heavy-duty active suspensions under four different road conditions to make the heavy-duty support platform reach a horizontal state, expressed as:

$$z_d = R(x, \beta)$$

$$R(y, \gamma)[A\ B\ C\ D] = \begin{bmatrix} 1 & 0 & 0 \\ 0 & \cos\beta & -\sin\beta \\ 0 & \sin\beta & \cos\beta \end{bmatrix} \begin{bmatrix} \cos\gamma & 0 & \sin\gamma \\ 0 & 1 & 0 \\ -\sin\gamma & 0 & \cos\gamma \end{bmatrix} [A\ B\ C\ D];$$

wherein a calculation result of the first target lifting displacement $z_d$ is expressed as:

$$z_d = \begin{bmatrix} z_{dA} \\ z_{dB} \\ z_{dC} \\ z_{dD} \end{bmatrix} = 0.5 \begin{bmatrix} a\cos\gamma\sin\beta - b\sin\gamma \\ a\cos\gamma\sin\beta + b\sin\gamma \\ -a\cos\gamma\sin\beta + b\sin\gamma \\ -a\cos\gamma\sin\beta - b\sin\gamma \end{bmatrix}.$$

In an embodiment, a calculation method of the target vertical displacement $z_s$ comprises:
(a) equating the wheel to a rigid body with spring stiffness, and equating the hydraulic cylinder to a mass-spring-damping system; establishing a mechanism diagram of a single heavy-duty active suspension under excitation of an alternating transverse-longitudinal wave road condition; and detecting and sending, by the encoder, an actual rotation angle θ of the through axle under a complex road condition to the general control system;

(b) setting a road excitation under the complex road condition as $Z_g$; and according to a white noise filtration method, obtaining a transfer function D of a unit white noise with respect to the road excitation $Z_g$, expressed as:

$$D = \frac{z_g(s)}{\omega(t)} = \frac{2\pi n_0 \sqrt{G_q(n_0)v}}{S + 2\pi n_1 v};$$

wherein $Z_g(s)$ represents road roughness; $n_1$ is a spatial frequency lower limit of the road roughness, with a value of 0.011 m−1; v is a speed of the heavy-duty suspension vehicle; $n_0$ is a reference spatial frequency, with a value of 0.1 m−1; $G_q(n_0)$ is a coefficient of the road roughness; and ω(t) is Gaussian white noise with a unit intensity of 1, and a frequency domain model of the road excitation $Z_g$ is expressed as:

$$Z_g(S) = \frac{2\pi n_0 \sqrt{G_q(n_0)v}}{S + 2\pi n_1 v} \omega(t);$$

(c) analyzing, by the general control system, rotation of the through axle of a single heavy-duty active suspension under the complex road condition to obtain the vertical displacement deviation $z_e$, expressed as:

$z_e = Z_g + GH \cos θ - FG \sin θ - GH;$ wherein GH is a radius of the wheel; and FG is a half of a track width of the heavy-duty active suspension; and (d) calculating, by the general control system, the vertical displacement deviation $z_e$ of the suspension A, the suspension B, the suspension C, and the suspension D as:

$$z_e = \begin{bmatrix} z_{eA} \\ z_{eB} \\ z_{eC} \\ z_{eD} \end{bmatrix} = \begin{bmatrix} Z_g + GH\cos θ_A - FG\sin θ_A - GH \\ Z_g + GH\cos θ_B - FG\sin θ_B - GH \\ Z_g + GH\cos θ_C - FG\sin θ_C - GH \\ Z_g + GH\cos θ_D - FG\sin θ_D - GH \end{bmatrix}.$$

Compared to the prior art, this application has the following beneficial effects.

1. The ultra-low heavy-duty active suspension system can be driven independently. The two wheel-driving units drive separately. The 360° slewing can be realized through the differential drive of the two wheel-driving units. The tilting angle of the axle shaft is monitored in real time by an encoder. The displacement of the active suspension with respect to the geodetic coordinate system is monitored by a displacement sensor. The controller controls the lifting unit to adjust the position of the active suspension.
2. The suspension vehicle adopts free modular combination design. According to the need, a plurality of active suspensions are disposed in pairs under the heavy-duty support platform. Each active suspension is independently driven. Each active suspension can rotate around its own centerline, so that the suspension vehicle can move in any direction and operate in a smaller space. Moreover, multiple suspensions are combined into a suspension vehicle as a whole, thereby increasing the load capacity of the suspension vehicle and meeting larger load.
3. The ultra-low lifting function of the active suspension can make up for the height difference between the working surfaces in the actual operation, and lift and lower in small space under the goods. The suspension vehicle can be driven independently, and can be freely adjusted and rotated in a small space, thereby facilitating the loading and unloading of goods. The vertical motion can be accurately controlled with the help of the controller, thereby facilitating the engagement with the platforms with different positions and heights during the loading and unloading process.
4. The suspension vehicle is safe and stable, and can actively fit the level road condition, transverse-wave road conditions, longitudinal-wave road conditions, and transverse-longitudinal wave alternating road conditions, thereby ensure that the goods stable and safe in the running process to reduce the damage to the goods.

BRIEF DESCRIPTION OF THE DRAWINGS

The present disclosure is described in further detail below in conjunction with the accompanying drawings and specific embodiments.

Figure 1:
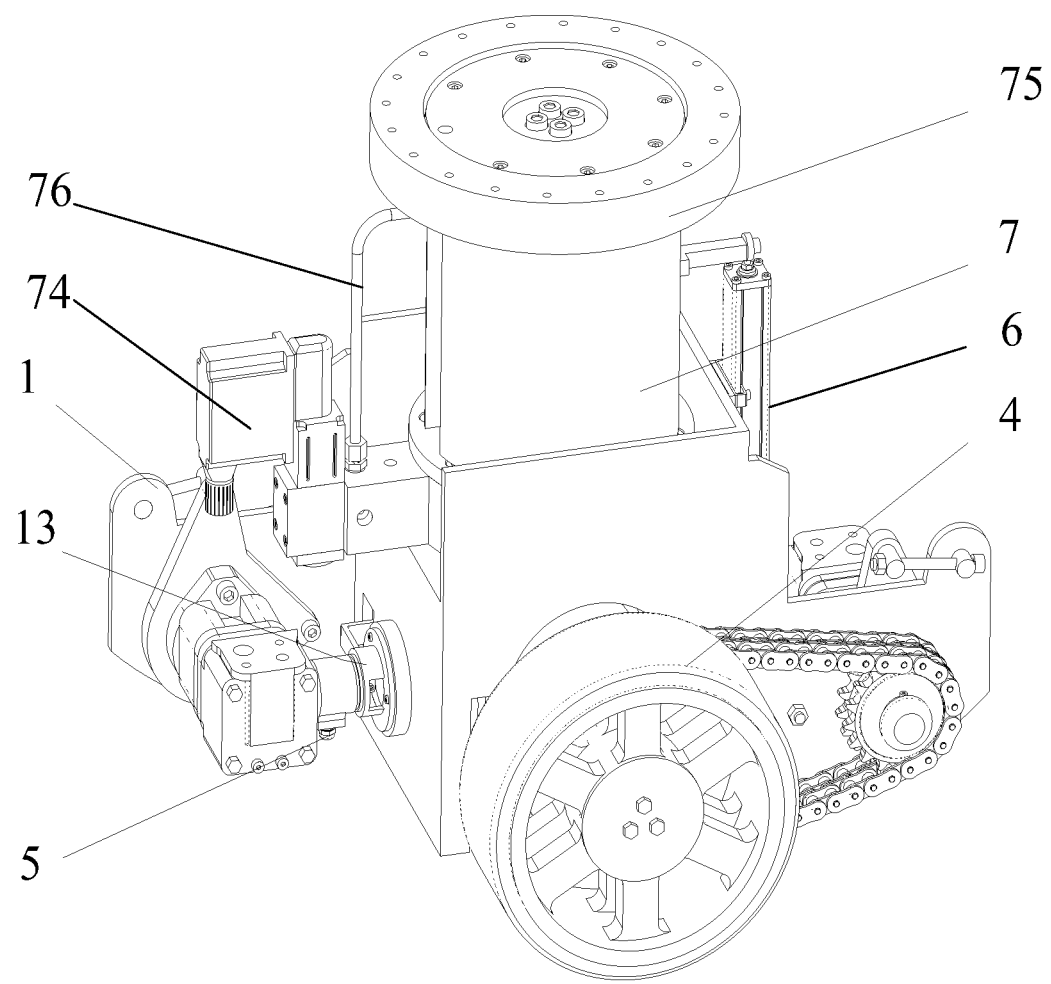
FIG. 1 is a perspective view of an ultra-low heavy-duty active suspension according to one embodiment of the present disclosure.

In the figures: 1—suspension frame; 2—pin axle; 3—through axle; 31—through hole; 32—wheel mounting hole; 4—wheel-driving unit; 41—hydraulic motor; 42—drive sprocket; 43—wheel axle; 44—driven sprocket; 45—roller chain; 46—wheel; 5—encoder; 6—displacement sensor; 7—lifting unit; 71—hydraulic cylinder; 711—piston rod; 72—inner guide sleeve; 73—outer guide sleeve; 74—proportional servo valve; 741—valve block; 75—slewing bearing; 76—pipeline; 8—self-aligning ball bearing; 11—bearing gasket; 12—limit screw; 13—encoder mounting bracket; 14—L-shaped shaft holder; 15—heavy-duty support platform; 16—clamping part; and 17—inertial measurement unit.

DETAILED DESCRIPTION OF EMBODIMENTS

The present disclosure is further described in detail with reference to the accompanying drawings. The accompanying drawings are presented in a simplified manner, which are only illustrative of the basic structure of the present disclosure, and show the components relevant to the present disclosure.

The ultra-low heavy-duty active suspension provided herein serves as a wheel system for a suspension vehicle of a heavy-duty transportation vehicle, and is generally provided in plurality below the suspension vehicle.

As shown in FIGS. 1-7, the ultra-low heavy-duty active suspension includes a suspension frame 1, a pin axle 2, a through axle 3, two wheel-driving units 4, an encoder 5, a displacement sensor 6, and a lifting unit 7. The lifting unit 7 is arranged on an upper side of the suspension frame 1 and is configured for driving a heavy-duty support platform 15 of a vehicle to rise and descend. The pin axle 2 is configured to run through the suspension frame 1 along a longitudinal direction (from front to rear). The through axle 3 is rotatably arranged on the pin axle 2 through a self-aligning ball bearing 8, and is configured to run through the suspension frame 1 along a transverse direction (from left to right). The two wheel-driving units 4 are respectively arranged on both ends of the through axle 3 through a bearing. The encoder 5 is installed on the through axle 3, and is configured for measuring a transverse (along the left-right direction) swing angle of the through axle 3. The displacement sensor 6 is arranged between an output end of the lifting unit 7 and the suspension frame 1.

Figure 6:
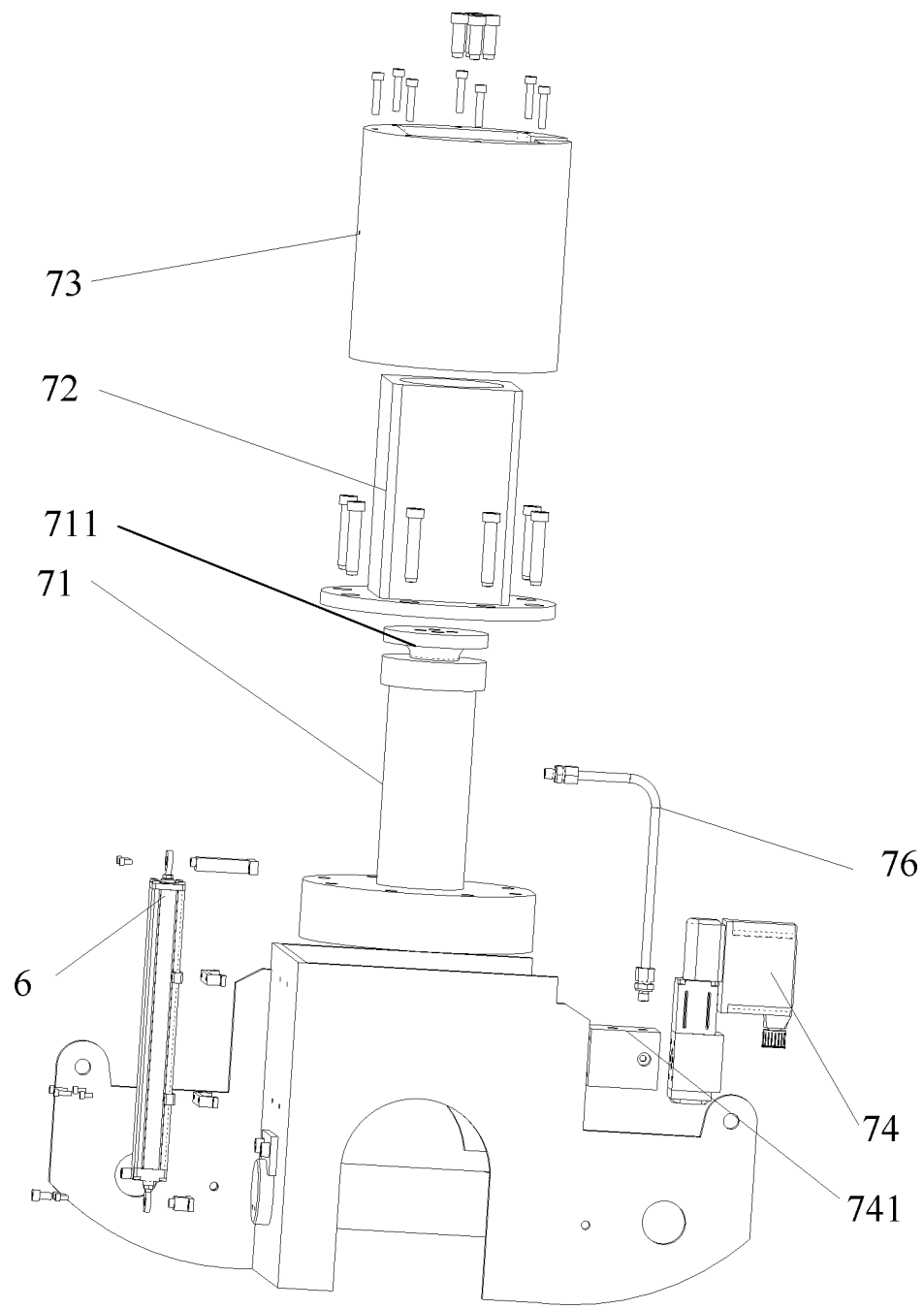
FIG. 6 is an exploded view of a lifting unit according to one embodiment of the present disclosure.
Figure 7:
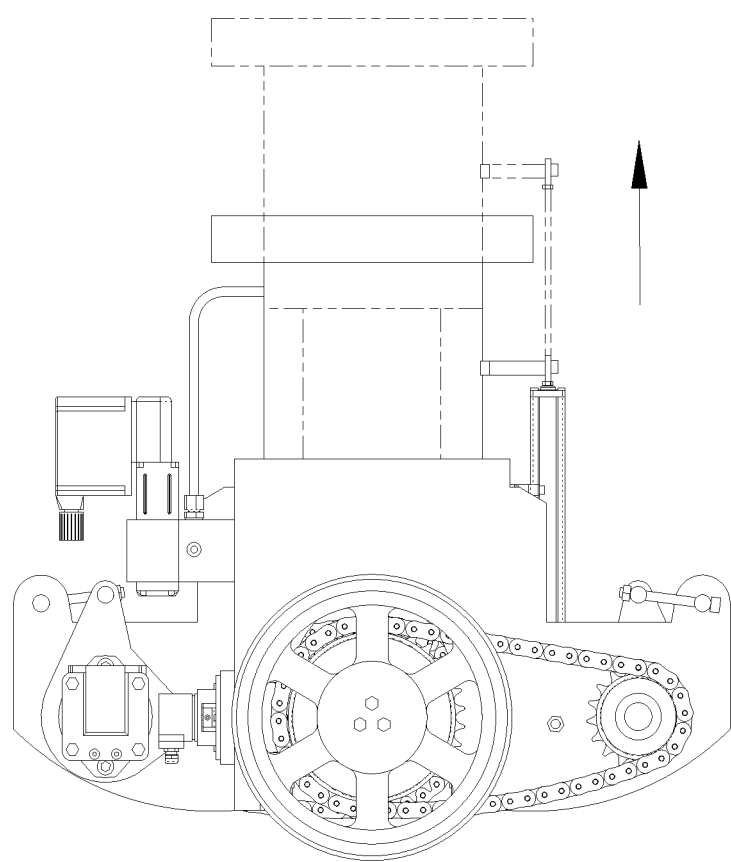
FIG. 7 schematically shows a lifting-lowering limit position of the active suspension according to one embodiment of the present disclosure.
Figure 8:
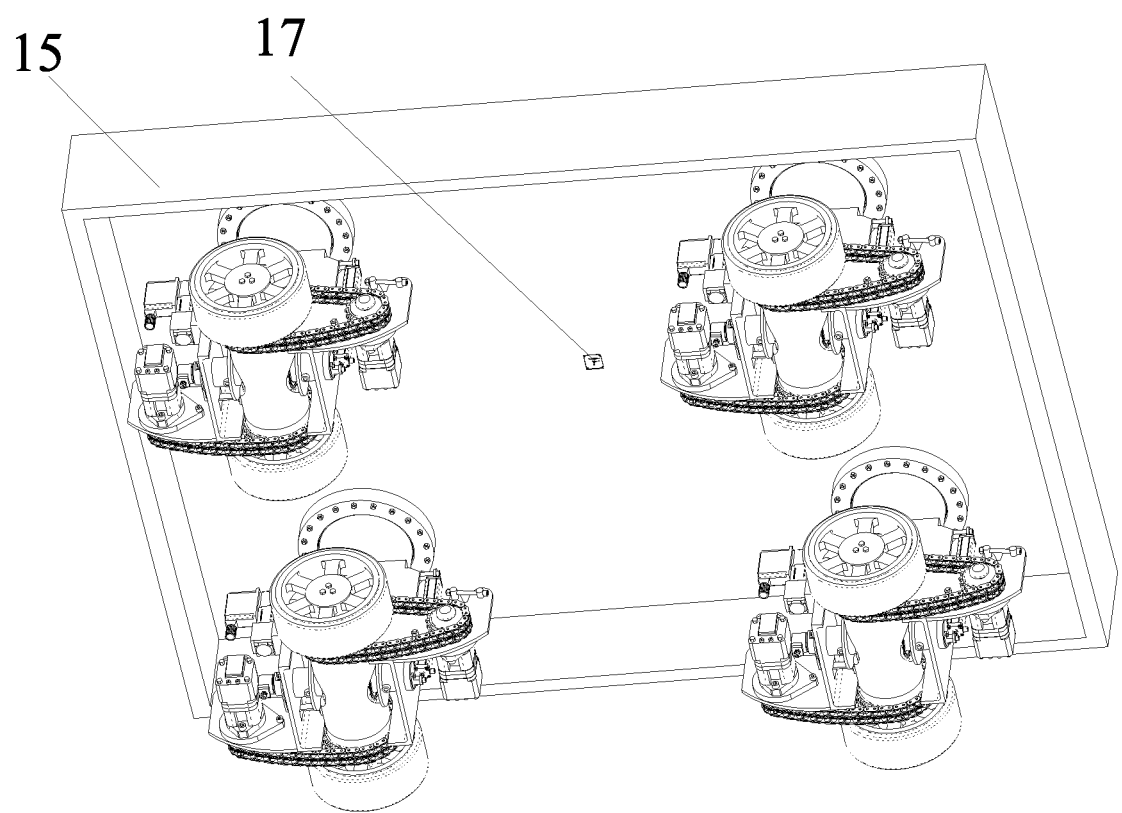
FIG. 8 is a perspective view of a suspension vehicle with four active suspensions according to one embodiment of the present disclosure.
Figure 9:
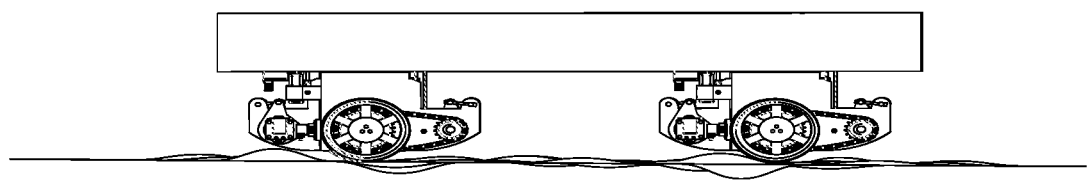
FIG. 9 schematically shows a running state of the heavy-duty suspension vehicle under road excitation in a level condition.
Figure 10:
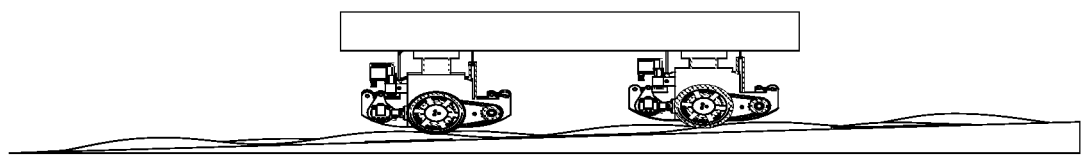
FIG. 10 schematically shows a running state of the heavy-duty suspension vehicle under road excitation in a longitudinal-wave condition.
Figure 11:
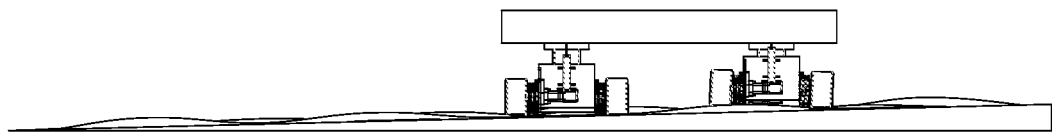
FIG. 11 schematically shows a running state of the heavy-duty suspension vehicle under road excitation in a transverse-wave condition.
Figure 12:
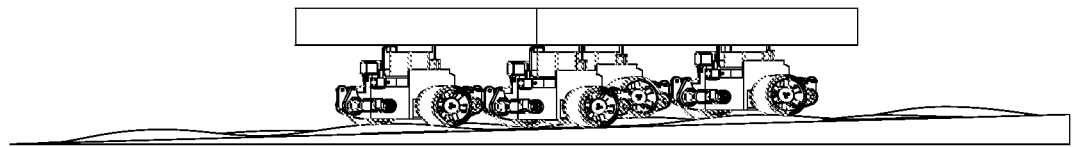
FIG. 12 schematically shows a running state of the heavy-duty suspension vehicle under road excitation in an alternating transverse-longitudinal wave condition.

Referring to FIGS. 6-7, the lifting unit 7 includes a hydraulic cylinder 71, an inner guide sleeve 72, an outer guide sleeve 73, a proportional servo valve 74, and a slewing bearing 75. The hydraulic cylinder 71 is mounted on the suspension frame 1. The inner guide sleeve 72 is sleevedly provided outside the hydraulic cylinder 71, and is fixedly connected to a base of the hydraulic cylinder 71. The outer guide sleeve 73 is slidingly connected outside the inner guide sleeve 72. The proportional servo valve 74 is configured for controlling a flow rate of the hydraulic cylinder 71. The slewing bearing 75 is configured for connection with the heavy-duty support platform 15 of the vehicle. A top end of a piston rod 711 of the hydraulic cylinder 71 is fixedly connected to an inner ring of the slewing bearing 75. An upper end of the outer guide sleeve 73 is fixedly connected to the inner ring of the slewing bearing 75. An outer ring of the slewing bearing 75 is fixedly connected to the heavy-duty support platform 15 of the vehicle. An oil return port of a valve block 741 of the proportional servo valve 74 is connected to an oil chamber of the hydraulic cylinder 71 through a pipeline 76. A ball is provided between the inner ring and the outer ring of the slewing bearing 75. A fixed end of the displacement sensor 6 is fixed to the end of the suspension frame 1 or the pin axle 2. The measuring end of the displacement sensor 6 is fixedly connected to the outer guide sleeve 73, which is synchronously raised and lowered with the piston rod 711.

Figure 3:
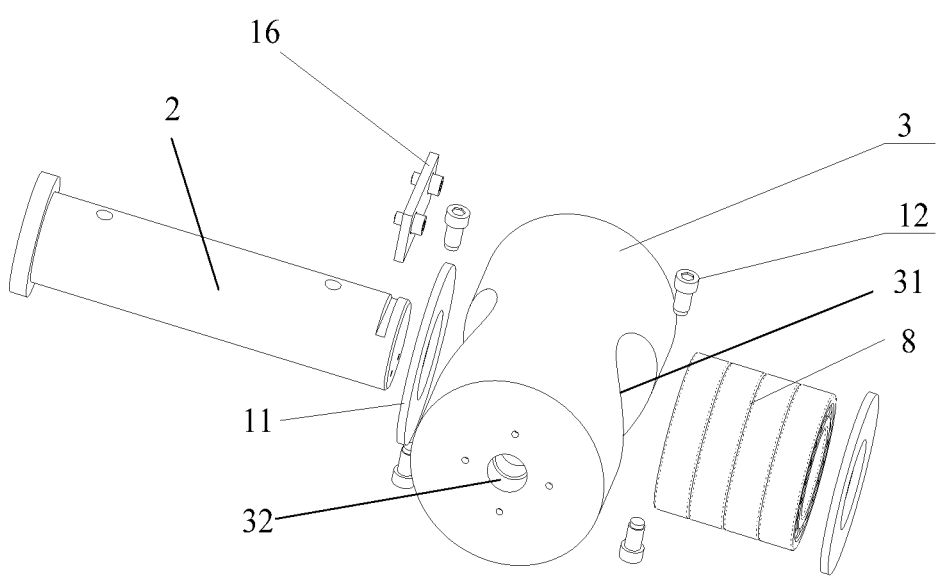
FIG. 3 schematically shows a connection structure of a through axle and a pin axle according to one embodiment of the present disclosure.

Referring to FIG. 3, a middle of the through axle 3 is provided with a through hole 31 along the longitudinal direction. Left and right ends of the through axle 3 are each provided with a wheel mounting hole 32. The pin axle 2 is fixedly connected to the suspension frame 1. The heavy-duty active suspension further includes a self-aligning ball bearing 8. An outer ring of the self-aligning ball bearing 8 is mounted in the through hole 31. An inner ring of the self-aligning ball bearing 8 is fixedly connected to the pin axle 2. Specifically, a first end of the pin axle 2 has a large end face used to mount the encoder mounting bracket 13 and is fixedly connected to the suspension frame 1 through the large end face; and a second end of the pin axle 2 has a clamping slot, into which a clamping part 16 is inserted. The clamping part 16 is fixedly connected to the suspension frame 1 to fix the second end of the pin axle 2 to the suspension frame 1.

Figure 2:
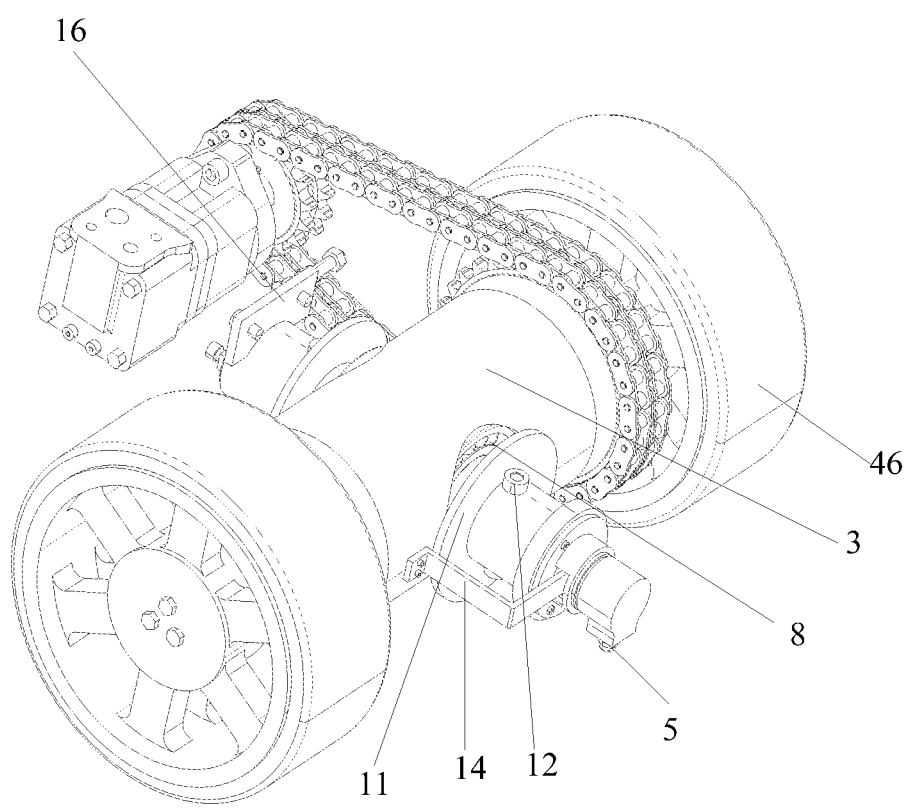
FIG. 2 schematically shows a partial internal structure of the ultra-low heavy-duty active suspension according to one embodiment of the present disclosure.

Referring to FIGS. 2 and 3, the pin axle 2 is sleevedly provided with a bearing gasket 11. The pin axle 2 is fixedly provided with a limit screw 12. The bearing gasket 11 is configured to be limited between the limit screw 12 and the through axle 3 for preventing the pin axle 2 from shifting. The pin axle 2 and the through axle 3 are connected using self-aligning ball bearings, so that the through axle 3 can swing freely to adapt complex road surfaces.

Figure 4:
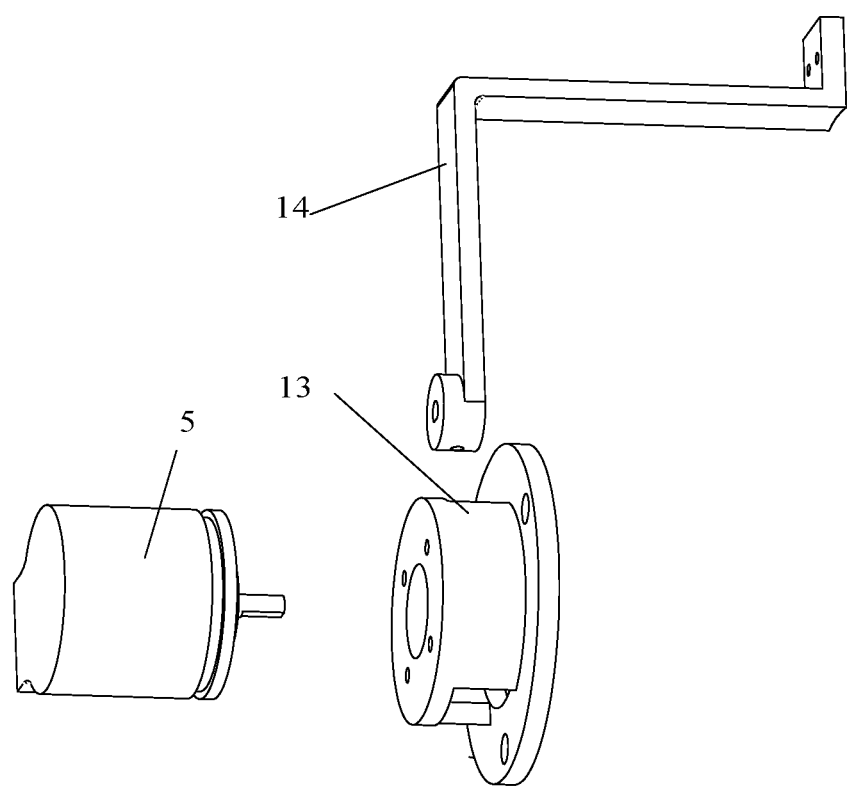
FIG. 4 is an exploded view of an encoder mounting bracket according to one embodiment of the present disclosure.

Referring to FIG. 4, one end of the pin axle 2 is fixedly connected to an encoder mounting bracket 13. A fixed end of the encoder 5 is mounted on the encoder mounting bracket 13. The encoder includes a rotating shaft. An end of the L-shaped shaft holder 14 is connected to the rotating shaft, and the other end of the L-shaped shaft holder 14 is fixedly connected to an outer side of the through axle 3. In this way, the upward and downward oscillation angles of the through axle 3 of the active suspension can be detected by the encoder 5.

Figure 5:
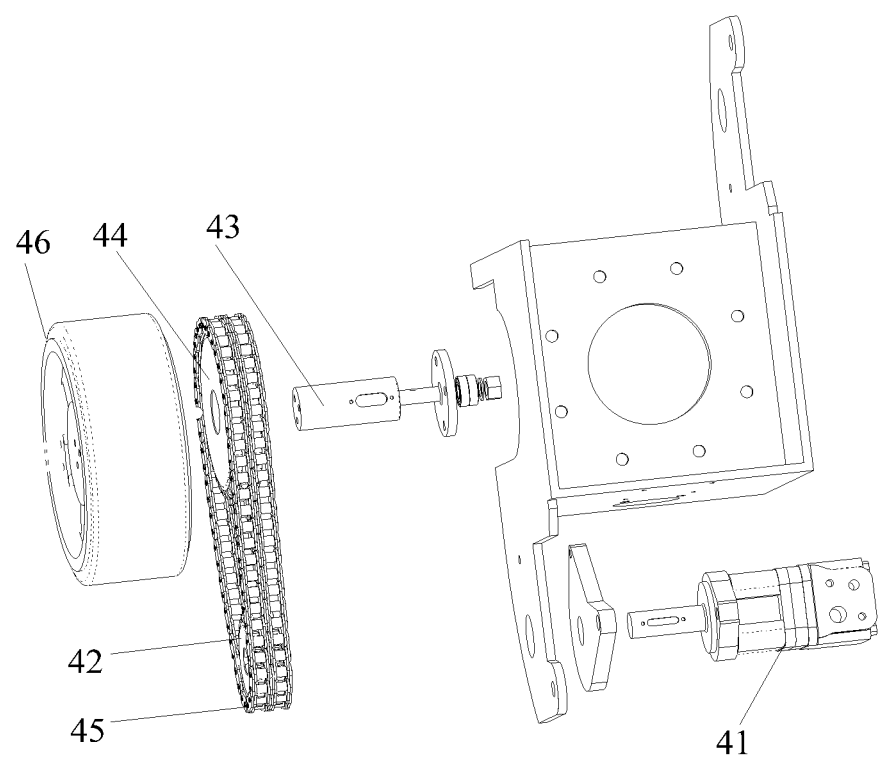
FIG. 5 is an exploded view of a wheel-driving unit according to one embodiment of the present disclosure.

Referring to FIGS. 2 and 5, the wheel-driving unit 4 includes a hydraulic motor 41, a drive sprocket 42, a wheel axle 43, a driven sprocket 44, a roller chain 45, and a wheel 46. The hydraulic motor 41 is mounted on the suspension frame 1. The drive sprocket 42 is coaxially mounted on an output shaft of the hydraulic motor 41. The wheel axle 43 is rotatably connected to the wheel mounting hole 32 through the bearing. The driven sprocket 44 is fixedly mounted on the wheel axle 43. The roller chain 45 is connected to the drive sprocket 42 and the driven sprocket 44. The wheel 46 is fixedly mounted on the wheel axle 43. The hydraulic motor 41, the encoder 5, the displacement sensor 6, and the proportional servo valve 74 are electrically coupled to a controller. The wheel-driving unit 4 is provided at two ends of the through axle 3. Each wheel 46 can be driven individually, and the 360°-rotation of the active suspension system can be realized by differential movement of the two wheels 46.

Referring to FIGS. 8-12, the ultra-low heavy-duty suspension vehicle includes the heavy-duty support platform 15 and a plurality of active suspensions as described above installed in pairs below the heavy-duty support platform 15. The heavy-duty support platform 15 is fixedly connected to the outer ring of the slewing bearing 75. Each controller is electrically connected to a general control system on the transport vehicle. An inertial measurement unit 17 is provided at the center of the heavy-duty support platform 15 for detecting the position and orientation of the heavy-duty support platform 15 in real time.

In this embodiment, one active suspension system is provided at each of the four corners of the heavy-duty support platform 15, with a total of four active suspension systems. Of course, more or less active suspension systems can be set according to the length of the suspension vehicle and the demand of the heavy-duty size, and more or less active suspension systems can realize the effect of automatically leveling the heavy-duty support platform 15.

The heavy-duty suspension vehicle needs to cope with different heavy-duty level road conditions, transverse-wave road conditions, longitudinal-wave road conditions, and alternating transverse-longitudinal wave road conditions.

Figure 13:
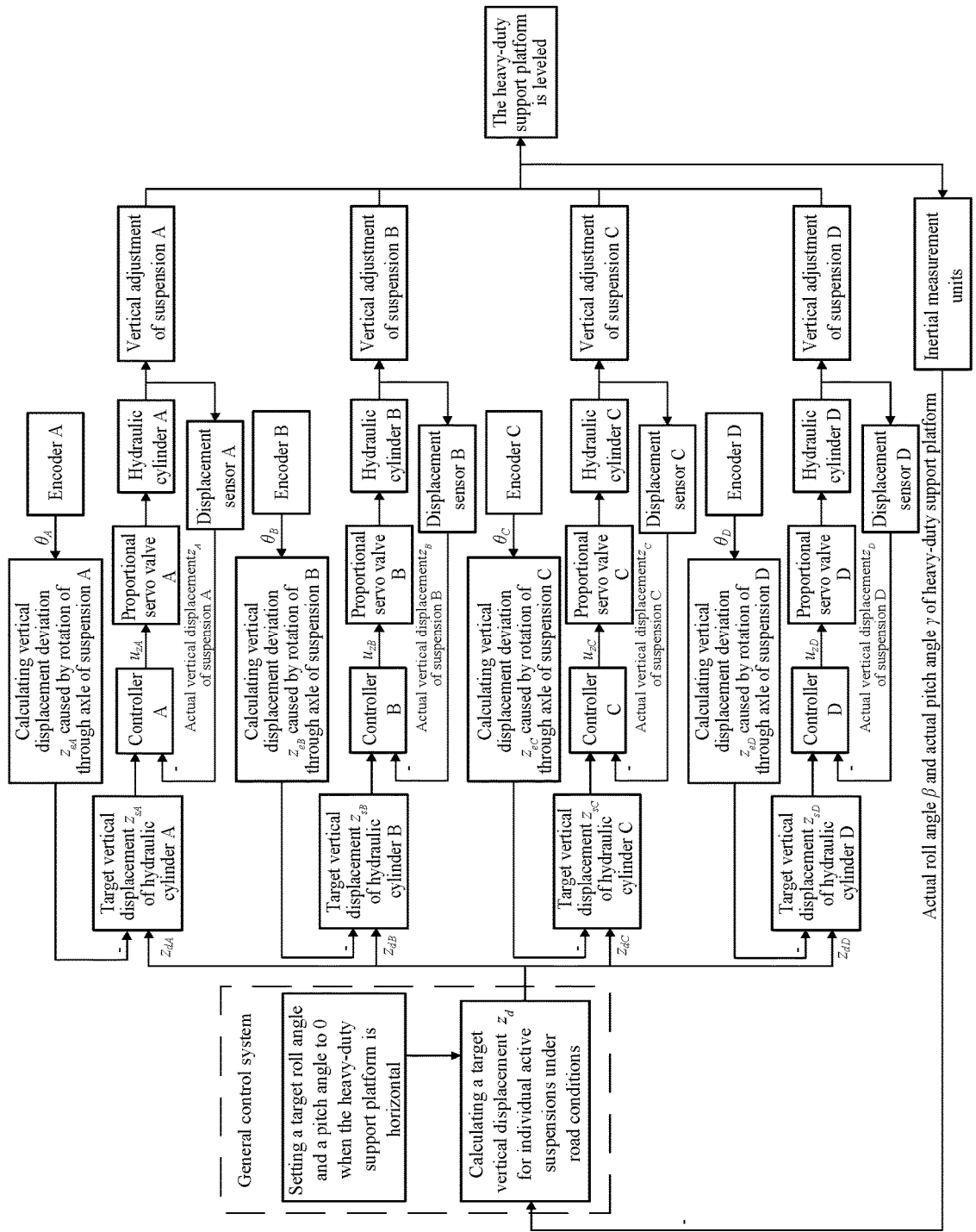
FIG. 13 is a flowchart of lifting-lowering control of the suspension vehicle with four active suspensions under road condition.

Referring to FIG. 13, in this embodiment, the leveling control method of the suspension vehicle includes the following steps.

Before running the suspension vehicle, it is necessary to initialize and check the data of the electrical components and hydraulic components in the system, check whether the input and output parameters of the electrical components and hydraulic components are normal: if yes, the general control system raises the alarm; and if no, execute the running step.

(S1) The inertial measurement unit 17 sends the detected real-time position and orientation data of the heavy-duty support platform 15 to the general control system. The general control system calculates the target vertical displacement $z_d$ of each of the four heavy-duty active suspensions when the heavy-duty support platform 15 is adjusted to a horizontal state.

The target vertical displacement $z_d$ of each of the four heavy-duty active suspensions is calculated through the following steps.

Figure 14:
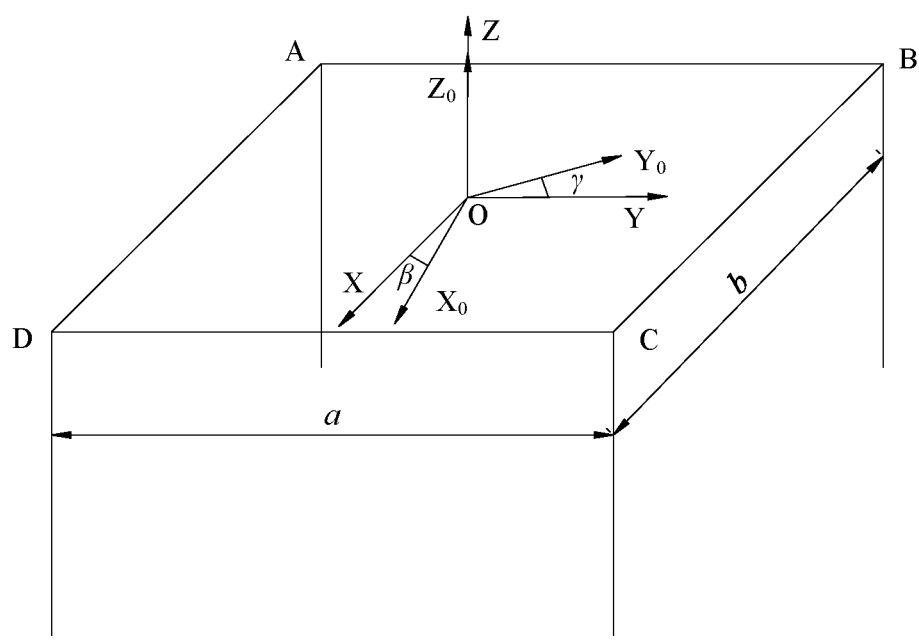
FIG. 14 is a schematic diagram of coordinate transformation for a heavy-duty support platform.

(S11) As shown in FIG. 14, a coordinate system $OX_0Y_0Z_0$ is set as the geodetic inertial coordinate system, and a coordinate system OXYZ is set as the relative coordinate system of the heavy-duty support platform 15. The inertial measurement unit 17 detects an X-axis rotation angle and a Y-axis rotation angle of the relative coordinate system relative to the geodetic inertial coordinate system under the actual road condition as a roll angle $\beta$ and a pitch angle $\gamma$, respectively. The inertial measurement unit 17 sends the detected roll angle $\beta$ and pitch angle $\gamma$ to the general control system.

(S12) The height of the center point of the heavy-duty support platform 15 remain unchanged. Firstly, a rotation matrix $R(x, \beta)$ is obtained by rotating the heavy-duty support platform (15) around an X-axis of the coordinate system OXYZ by an angle of $\beta$. Then, a rotation matrix $R(y, \gamma)$ is obtained by rotating the heavy-duty support platform (15) around a Y-axis of the coordinate system OXYZ by an angle of $\gamma$.

(S13) The four suspensions of the heavy-duty suspension vehicle are respectively defined as suspension A, suspension B, suspension C, and suspension D. The coordinates in the relative coordinate system of the heavy-duty support platform 15 are expressed as:

$$[A \ B \ C \ D] = \begin{bmatrix} -0.5b & -0.5b & 0.5b & 0.5b \\ -0.5a & 0.5a & 0.5a & -0.5a \\ 0 & 0 & 0 & 0 \end{bmatrix}.$$

(S14) Based on the rotation matrix $R(x, \beta)$, the rotation matrix $R(y, \gamma)$, and the coordinates of the four heavy-duty active suspensions in the relative coordinate system, the general control system calculates the target vertical displacement $z_d$ of each of the four heavy-duty active suspensions under four different road conditions to make the heavy-duty support platform 15 reach a horizontal state, expressed as:

$$z_d = R(x, \beta) R(y, \gamma) [A \ B \ C \ D] =$$

$$\begin{bmatrix} 1 & 0 & 0 \\ 0 & \cos\beta & -\sin\beta \\ 0 & \sin\beta & \cos\beta \end{bmatrix} \begin{bmatrix} \cos\gamma & 0 & \sin\gamma \\ 0 & 1 & 0 \\ -\sin\gamma & 0 & \cos\gamma \end{bmatrix} [A \ B \ C \ D].$$

The calculation result of the target vertical displacement $z_d$ is expressed as:

$$z_d = \begin{bmatrix} z_{dA} \\ z_{dB} \\ z_{dC} \\ z_{dD} \end{bmatrix} = 0.5 \begin{bmatrix} a\cos\gamma\sin\beta - b\sin\gamma \\ a\cos\gamma\sin\beta + b\sin\gamma \\ -a\cos\gamma\sin\beta + b\sin\gamma \\ -a\cos\gamma\sin\beta - b\sin\gamma \end{bmatrix}.$$

(S2) The encoder 5 detects and sends actual rotation angles $\theta_A$, $\theta_B$, $\theta_C$, and $\theta_D$ of the through axle 3 of the four heavy-duty active suspensions to the general control system. Based on the rotation angles $\theta_A$, $\theta_B$, $\theta_C$, and $\theta_D$, the general control system calculates the vertical displacement deviation $z_e$ caused by rotation of the through axle 3 of the four heavy-duty active suspensions.

A calculation method of the target vertical displacement $z_s$ of each hydraulic cylinder 71 includes the following steps.

Figure 15:
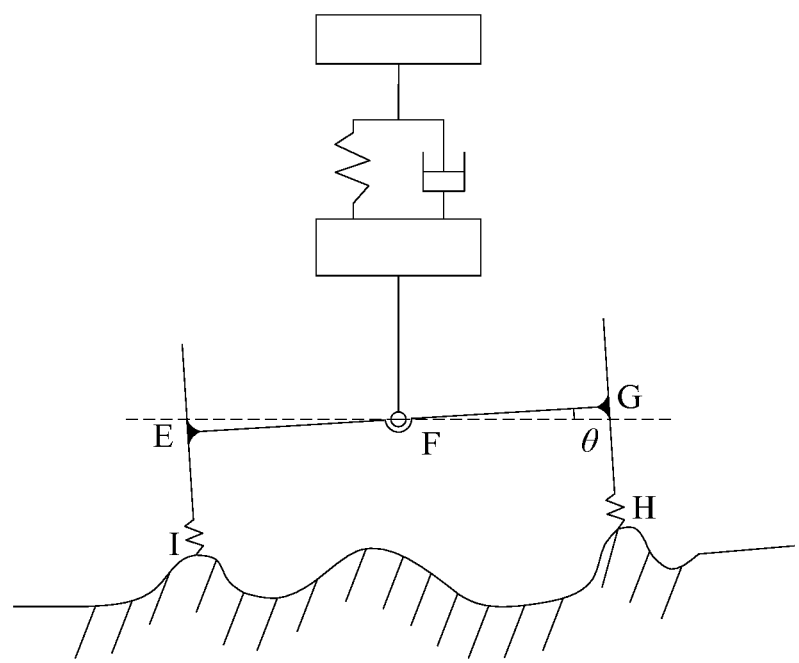
FIG. 15 is a mechanism diagram of a single active suspension under excitation of the alternating transverse-longitudinal wave road condition.

(S21) As shown in FIG. 15, the wheel 46 is equated to a rigid body with spring stiffness, the hydraulic cylinder 71 is equated to a mass-spring-damping system, then the mechanism diagram of a single heavy-duty active suspension under excitation of an alternating transverse-longitudinal wave road condition is established. The encoder 5 detects and sends an actual rotation angle $\theta$ of the through axle 3 under a complex road condition to the general control system.

(S22) The road excitation under the complex road condition is set as $Z_g$. According to a white noise filtration method, a transfer function D of a unit white noise with respect to the road excitation $Z_g$ is expressed as:

$$D = \frac{z_g(s)}{\omega(t)} = \frac{2\pi n_0 \sqrt{G_q(n_0) v}}{S + 2\pi n_1 v}.$$

In the formula above, $Z_g(s)$ represents road roughness; $n_1$ is a spatial frequency lower limit of the road roughness, with a value of 0.011 m−1; v is a speed of the heavy-duty suspension vehicle; $n_0$ is a reference spatial frequency, with a value of 0.1 m−1; $G_q(n_0)$ is a coefficient of the road roughness; and $\omega(t)$ is Gaussian white noise with a unit intensity of 1. A frequency domain model of the road excitation $Z_g$ is expressed as:

$$Z_g(S) = \frac{2\pi n_0 \sqrt{G_q(n_0) v}}{S + 2\pi n_1 v} \omega(t).$$

(S23) The general control system analyzes rotation of the through axle 3 of a single heavy-duty active suspension under the complex road condition to obtain the vertical displacement deviation $z_e$, expressed as:

$$z_e = Z_g + GH\cos\theta - FG\sin\theta - GH.$$

In the formula above, GH is a radius of the wheel 46; and FG is a half of a track width of the heavy-duty active suspension, where the track width refers to the distance between two wheels on the same axle.

(S24) The general control system calculates the vertical displacement deviation $z_e$ of the suspension A, the suspension B, the suspension C, and the suspension D, expressed as:

$$z_e = \begin{bmatrix} z_{eA} \\ z_{eB} \\ z_{eC} \\ z_{eD} \end{bmatrix} = \begin{bmatrix} Z_g + GH\cos\theta_A - FG\sin\theta_A - GH \\ Z_g + GH\cos\theta_B - FG\sin\theta_B - GH \\ Z_g + GH\cos\theta_C - FG\sin\theta_C - GH \\ Z_g + GH\cos\theta_D - FG\sin\theta_D - GH \end{bmatrix}.$$

(S3) The general control system calculates the target vertical displacement $z_s$ of each hydraulic cylinder 71, and a calculation formula of the target vertical displacement $z_s$ is expressed as:

$$z_s = z_d - z_e.$$

(S4) The general control system sends the target vertical displacement $z_s$ to the controller of each of the four heavy-duty active suspensions. At the same time, the displacement sensor 6 of each of the four heavy-duty active suspensions collects an actual vertical displacement z of the corresponding heavy-duty active suspension. The error $e_z$ is obtained, wherein the error $e_z$ is a difference between the target vertical displacement $z_s$ and the actual vertical displacement z. The proportion-integral-differential (PID) algorithm is performed on the error $e_z$ to obtain a control signal $u_z$ of the four heavy-duty active suspensions. The controller sends the control signal $u_z$ to a pump station and the proportional servo valve 74, so that the pump station supplies oil, and the proportional servo valve 74 controls flow of the oil to realize extension and retraction of the hydraulic cylinder 71, so as to control the lifting unit to level the heavy-duty support platform 15 to ensure the heavy-duty suspension vehicle level when encountering road condition changes.

In the absence of the tractor of the transportation vehicle, the four active suspensions also enable the suspension vehicle to rotate and adjust height to accommodate docking with the head of the transportation vehicle in a confined space.

Specifically, since the eight wheels 46 of the four suspensions are individually driven, when steering is required, the suspension vehicle can rotate itself by simply controlling the rotation speed of the inner wheel in the direction of rotation required to be less than that of the outer wheel. Moreover, the suspension vehicle can adjust the overall height of the suspension vehicle by lifting and lowering the hydraulic cylinders 71 according to the height of the position where it is docked to the head of the transportation vehicle. Additionally, the height adjustment of the suspension vehicle can facilitate docking with the loading-unloading platform.

Since each heavy-duty active suspension has two wheels 46 opposite to each other, and the two wheels 46 are connected coaxially, so that each heavy-duty active suspension can well adapt to the angle of the road surface at its position. The contact area between the wheels and the road surface is large, and the suspension vehicle is stable when moving.

The suspension vehicle adopts free modular combination design. According to the need, a plurality of active suspension systems are arranged in pairs under the heavy-duty support platform 15. Each active suspension system is independently driven. Each active suspension system can rotate around its own centerline, so that the suspension vehicle can move in any direction and operate in a smaller space. Moreover, multiple suspensions are combined into a suspension vehicle as a whole, thereby increasing the load capacity of the suspension vehicle and meeting larger load.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A heavy-duty active suspension, comprising:
   a suspension frame;
   a lifting unit;
   a pin axle;
   a through axle;
   two wheel-driving units;
   an encoder; and
   a displacement sensor;
   wherein the lifting unit is arranged on an upper side of the suspension frame, and is configured for driving a heavy-duty support platform of a vehicle to rise and descend; the pin axle is configured to run through the suspension frame along a longitudinal direction; the through axle shaft is rotatably arranged on the pin axle through a first bearing, and is configured to run through the suspension frame along a transverse direction; the two wheel-driving units are respectively arranged on both ends of the through axle through a second bearing; the encoder is arranged on the through axle, and is configured for measuring a transverse swing angle of the through axle; and the displacement sensor is arranged between an output end of the lifting unit and the suspension frame;
   the lifting unit comprises a hydraulic cylinder, an inner guide sleeve, an outer guide sleeve, a proportional servo valve, and a slewing bearing;
   the hydraulic cylinder is arranged on the suspension frame; the inner guide sleeve is sleevedly provided outside the hydraulic cylinder, and is fixedly connected to a base of the hydraulic cylinder; the outer guide sleeve is slidingly connected outside the inner guide sleeve; the proportional servo valve is configured for controlling a flow rate of the hydraulic cylinder; and the slewing bearing is configured for connection with the heavy-duty support platform of the vehicle; and
   a top end of a piston rod of the hydraulic cylinder is fixedly connected to an inner ring of the slewing bearing; an upper end of the outer guide sleeve is fixedly connected to the inner ring of the slewing bearing; and an outer ring of the slewing bearing is fixedly connected to the heavy-duty support platform of the vehicle; and an oil return port of the proportional servo valve is connected to an oil chamber of the hydraulic cylinder through a pipeline.

2. The heavy-duty active suspension of claim 1, wherein a middle of the through axle is provided with a through hole along the longitudinal direction; two ends of the through axle are each provided with a wheel mounting hole; the pin axle is fixedly connected to the suspension frame; the heavy-duty active suspension further comprises a self-aligning ball bearing; an outer ring of the self-aligning ball bearing is mounted in the through hole; and an inner ring of the self-aligning ball bearing is fixedly connected to the pin axle.

3. The heavy-duty active suspension of claim 2, wherein each of the two wheel-driving units comprises a hydraulic motor, a drive sprocket, a wheel axle, a driven sprocket, a roller chain and a wheel;

the hydraulic motor is mounted on the suspension frame; the drive sprocket is coaxially arranged on an output shaft of the hydraulic motor; the wheel axle is rotatably connected to the wheel mounting hole through a third bearing; the driven sprocket is fixedly mounted on the wheel axle; the roller chain is connected to the drive sprocket and the driven sprocket; and the wheel is fixedly mounted on the wheel axle; and the hydraulic motor, the encoder, the displacement sensor, and the proportional servo valve are electrically coupled to a controller.

4. The heavy-duty active suspension of claim 2, wherein the pin axle is sleevedly provided with a bearing gasket; the pin axle is fixedly provided with a limit screw; and the bearing gasket is configured to be limited between the limit screw and the through axle for preventing the pin axle from shifting.

5. The heavy-duty active suspension of claim 1, wherein an end of the pin axle is fixedly connected to an encoder mounting bracket; a fixed end of the encoder is mounted on the encoder mounting bracket; the encoder comprises a rotating shaft; the rotating shaft is connected to a first end of a L-shaped shaft holder; and a second end of the L-shaped shaft holder is fixedly connected to an outer side of the through axle.

6. The heavy-duty active suspension of claim 1, wherein a fixed end of the displacement sensor is fixed to the suspension frame or an end of the pin axle; and a measuring end of the displacement sensor is fixedly connected to the outer guide sleeve.

7. A heavy-duty suspension vehicle, comprising:
a heavy-duty support platform; and
the heavy-duty active suspension of claim 3;
wherein the heavy-duty active suspension is provided in plurality, and a plurality of heavy-duty active suspensions are arranged in pairs below the heavy-duty support platform;
the heavy-duty support platform is fixedly connected to the outer ring of the slewing bearing; the controller is electrically connected to a general control system on a transport vehicle; and a center of the heavy-duty support platform is provided with an inertial measurement unit for detecting a position and orientation of the heavy-duty support platform in real time.

8. A leveling control method of the heavy-duty suspension vehicle of claim 7, the number of the plurality of heavy-duty active suspensions being four, four heavy-duty active suspensions being respectively provided at four corners of the heavy-duty support platform, and the leveling control method comprising:

(S1) sending, by the inertial measurement unit, a detected real-time position and orientation data of the heavy-duty support platform to the general control system; and calculating, by the general control system, a target vertical displacement $z_d$ of each of four heavy-duty active suspensions when the heavy-duty support platform is adjusted to a horizontal state;

(S2) detecting and sending, by the encoder, rotation angles $\theta_A$, $\theta_B$, $\theta_C$, and $\theta_D$ of through axles of the four heavy-duty active suspensions to the general control system; based on the rotation angles $\theta_A$, $\theta_B$, $\theta_C$, and $\theta_D$, calculating, by the general control system, a vertical displacement deviation $z_e$ caused by rotation of the through axles of the four heavy-duty active suspensions;

(S3) calculating, by the general control system, a target vertical displacement $z_s$ of the hydraulic cylinder of each of the four heavy-duty active suspensions, expressed as:

$$z_s = z_d - z_e,$$

(S4) sending, by the general control system, the target vertical displacement $z_s$ to the controller of each of the four heavy-duty active suspensions;

collecting, by the displacement sensor of each of the four heavy-duty active suspensions, an actual vertical displacement z;

obtaining an error $e_z$, wherein the error $e_z$ is a difference between the target vertical displacement $z_s$ and the actual vertical displacement z;

performing a proportion-integral-differential (PID) algorithm on the error $e_z$ to obtain a control signal $u_z$ of the four heavy-duty active suspensions; and sending, by the controller, the control signal $u_z$ to a pump station and the proportional servo valve, so that the pump station supplies oil, and the proportional servo valve controls flow of the oil to realize extension and retraction of the hydraulic cylinder, so as to control the lifting unit to level the heavy-duty support platform to ensure the heavy-duty suspension vehicle level when encountering road condition changes.

9. The leveling control method of claim 8, wherein the target vertical displacement $z_d$ of each of the four heavy-duty active suspensions is calculated through steps of:

(S11) setting a coordinate system $OX_0Y_0Z_0$ as a geodetic inertial coordinate system and a coordinate system OXYZ as a relative coordinate system of the heavy-duty support platform; detecting, by the inertial measurement unit, an X-axis rotation angle and a Y-axis rotation angle of the relative coordinate system relative to the geodetic inertial coordinate system under an actual road condition as a roll angle $\beta$ and a pitch angle $\gamma$, respectively; and sending the roll angle $\beta$ and the pitch angle $\gamma$ to the general control system;

(S12) keeping a height of a center point of the heavy-duty support platform unchanged; obtaining a rotation matrix R(x, $\beta$) by rotating the heavy-duty support platform around an X-axis of the coordinate system OXYZ by an angle of $\beta$; and obtaining a rotation matrix R(y, $\gamma$) by rotating the heavy-duty support platform around a Y-axis of the coordinate system OXYZ by an angle of $\gamma$;

(S13) defining the four heavy-duty active suspensions of the heavy-duty suspension vehicle respectively as suspension A, suspension B, suspension C, and suspension D, whose coordinates in the relative coordinate system are expressed as:

$$[A \ B \ C \ D] = \begin{bmatrix} -0.5b & -0.5b & 0.5b & 0.5b \\ -0.5a & 0.5a & 0.5a & -0.5a \\ 0 & 0 & 0 & 0 \end{bmatrix};$$

and (S14) based on the rotation matrix R(x, β), the rotation matrix R(y, γ), and the coordinates of the four heavy-duty active suspensions in the relative coordinate system, calculating, by the general control system, the target vertical displacement $z_d$ of each of the four heavy-duty active suspensions under four different road conditions to make the heavy-duty support platform reach a horizontal state, expressed as:

$$z_d = R(x, \beta)R(y, \gamma)[A\ B\ C\ D] =$$

$$\begin{bmatrix} 1 & 0 & 0 \\ 0 & \cos\beta & -\sin\beta \\ 0 & \sin\beta & \cos\beta \end{bmatrix} \begin{bmatrix} \cos\gamma & 0 & \sin\gamma \\ 0 & 1 & 0 \\ -\sin\gamma & 0 & \cos\gamma \end{bmatrix} [A\ B\ C\ D];$$

wherein a calculation result of the target vertical displacement $z_d$ is expressed as:

$$z_d = \begin{bmatrix} z_{dA} \\ z_{dB} \\ z_{dC} \\ z_{dD} \end{bmatrix} = 0.5 \begin{bmatrix} a\cos\gamma\sin\beta - b\sin\gamma \\ a\cos\gamma\sin\beta + b\sin\gamma \\ -a\cos\gamma\sin\beta + b\sin\gamma \\ -a\cos\gamma\sin\beta - b\sin\gamma \end{bmatrix}.$$

10. The leveling control method of claim 9, wherein a calculation method of the target vertical displacement $z_s$ comprises:

(a) equating the wheel to a rigid body with spring stiffness, and equating the hydraulic cylinder to a mass-spring-damping system; establishing a mechanism diagram of a single heavy-duty active suspension under excitation of an alternating transverse-longitudinal wave road condition; and detecting and sending, by the encoder, an actual rotation angle θ of the through axle under a complex road condition to the general control system;

(b) setting a road excitation under the complex road condition as $Z_g$; and according to a white noise filtration method, obtaining a transfer function D of a unit white noise with respect to the road excitation $Z_g$, expressed as:

$$D = \frac{z_g(s)}{\omega(t)} = \frac{2\pi n_0 \sqrt{G_q(n_0)v}}{S + 2\pi n_1 v};$$

wherein $Z_g(s)$ represents road roughness; $n_1$ is a spatial frequency lower limit of the road roughness, with a value of 0.011 m−1; v is a speed of the heavy-duty suspension vehicle; $n_0$ is a reference spatial frequency, with a value of 0.1 m−1; $G_q(n_0)$ is a coefficient of the road roughness; and ω(t) is Gaussian white noise with a unit intensity of 1, and a frequency domain model of the road excitation $Z_g$ is expressed as:

$$Z_g(S) = \frac{2\pi n_0 \sqrt{G_q(n_0)v}}{S + 2\pi n_1 v} \omega(t);$$

(c) analyzing, by the general control system, rotation of the through axle of a single heavy-duty active suspension under the complex road condition to obtain the vertical displacement deviation $z_e$, expressed as:

$$z_e = Z_g + GH \cos\theta - FG \sin\theta - GH;$$

wherein GH is a radius of the wheel; and FG is a half of a track width of the heavy-duty active suspension; and (d) calculating, by the general control system, the vertical displacement deviation $z_e$ of the suspension A, the suspension B, the suspension C, and the suspension D as:

$$z_e = \begin{bmatrix} z_{eA} \\ z_{eB} \\ z_{eC} \\ z_{eD} \end{bmatrix} = \begin{bmatrix} Z_g + GH\cos\theta_A - FG\sin\theta_A - GH \\ Z_g + GH\cos\theta_B - FG\sin\theta_B - GH \\ Z_g + GH\cos\theta_C - FG\sin\theta_C - GH \\ Z_g + GH\cos\theta_D - FG\sin\theta_D - GH \end{bmatrix}.$$

* * * * *